(12) United States Patent
Miglio et al.

(10) Patent No.: US 8,974,671 B2
(45) Date of Patent: Mar. 10, 2015

(54) PROCESS FOR THE TREATMENT OF THE AQUEOUS STREAM COMING FROM THE FISCHER-TROPSCH REACTION BY MEANS OF ION EXCHANGE RESINS

(75) Inventors: Roberta Miglio, Oleggio (IT); Renzo Bignazzi, Legnano (IT)

(73) Assignee: ENI S.p.A., Rome (IT)

( * ) Notice: Subject to any disclaimer, the term of this patent is extended or adjusted under 35 U.S.C. 154(b) by 1082 days.

(21) Appl. No.: 12/996,464

(22) PCT Filed: May 28, 2009

(86) PCT No.: PCT/EP2009/003850
§ 371 (c)(1),
(2), (4) Date: Mar. 8, 2011

(87) PCT Pub. No.: WO2009/146854
PCT Pub. Date: Dec. 10, 2009

(65) Prior Publication Data
US 2011/0147313 A1    Jun. 23, 2011

(30) Foreign Application Priority Data
Jun. 6, 2008    (IT) .............................. MI2008A1035

(51) Int. Cl.
*C02F 3/00* (2006.01)
*C02F 1/42* (2006.01)
(Continued)

(52) U.S. Cl.
CPC . *C02F 1/42* (2013.01); *B01J 39/04* (2013.01); *B01J 41/04* (2013.01); *B01J 45/00* (2013.01);
(Continued)

(58) Field of Classification Search
USPC ........................ 210/663, 664, 669, 670, 692
See application file for complete search history.

(56) References Cited

U.S. PATENT DOCUMENTS 3,882,153 A * 5/1975 Seki et al. ...................... 554/184
5,376,250 A * 12/1994 Hamano ........................ 204/529
(Continued)

FOREIGN PATENT DOCUMENTS

DE      226547 A   *  8/1985
EP     1 431 248        6/2004
(Continued)

OTHER PUBLICATIONS

U.S. Appl. No. 12/863,101, filed Jan. 18, 2011, Carnelli, et al.
(Continued)

*Primary Examiner* — Chester Barry
(74) *Attorney, Agent, or Firm* — Oblon, McClelland, Maier & Neustadt, L.L.P.

(57) ABSTRACT

Process for the treatment of the aqueous stream coming from the Fischer-Tropsch reaction comprising: feeding the aqueous stream containing the organic by products of the reaction to a distillation or stripping column; separation from the column of an aqueous stream enriched in alcohols having from 1 to 8 carbon atoms and other possible volatile compounds; feeding the aqueous stream containing the organic acids leaving the bottom of the distillation column to an ion exchange step wherein said aqueous stream is put in contact with an anionic exchange resin bed and the production of two outgoing aqueous streams: an aqueous stream (i) enriched in organic acids having from 1 to 8 carbon atoms; a purified aqueous stream (ii) with a low content of organic acids.

19 Claims, 2 Drawing Sheets

(51) Int. Cl.

| | |
|---|---|
| *B01J 39/04* | (2006.01) |
| *B01J 41/04* | (2006.01) |
| *B01J 45/00* | (2006.01) |
| *B01J 47/02* | (2006.01) |
| *C02F 1/04* | (2006.01) |
| *B01D 1/00* | (2006.01) |
| *B01D 1/22* | (2006.01) |
| *B01D 3/00* | (2006.01) |
| *C02F 1/469* | (2006.01) |
| *C02F 1/68* | (2006.01) |
| *C02F 103/36* | (2006.01) |

(52) U.S. Cl.
CPC ............... *B01J 47/026* (2013.01); *C02F 1/04* (2013.01); *B01D 1/0017* (2013.01); *B01D 1/22* (2013.01); *B01D 3/002* (2013.01); *C02F 1/4693* (2013.01); *C02F 1/683* (2013.01); *C02F 2001/422* (2013.01); *C02F 2001/425* (2013.01); *C02F 2103/365* (2013.01)
USPC ........... 210/663; 210/664; 210/669; 210/670; 210/692

(56) References Cited

U.S. PATENT DOCUMENTS

| | | | | |
|---|---|---|---|---|
| 5,624,566 | A | * | 4/1997 | Wytcherley et al. .......... 210/634 |
| 6,426,007 | B1 | | 7/2002 | Sachdev et al. |
| 7,105,094 | B1 | * | 9/2006 | Lee et al. ..................... 210/703 |
| 7,141,707 | B2 | * | 11/2006 | Beckmann et al. ........... 568/913 |
| 7,153,432 | B2 | * | 12/2006 | Kohler et al. ................. 210/640 |
| 8,022,108 | B2 | * | 9/2011 | Bull et al. ..................... 518/726 |
| 8,202,431 | B2 | * | 6/2012 | Werner et al. ................. 210/673 |
| 2004/0171702 | A1 | * | 9/2004 | Odueyungbo et al. ........ 518/715 |
| 2006/0169586 | A1 | * | 8/2006 | Zhang et al. .................. 204/450 |

FOREIGN PATENT DOCUMENTS

| | | | |
|---|---|---|---|
| JP | 05000300 | A * | 1/1993 |
| JP | 09103298 | A * | 4/1997 |
| JP | 2005296892 | A * | 10/2005 |
| WO | 03 106349 | | 12/2003 |

OTHER PUBLICATIONS

U.S. Appl. No. 12/863,289, filed Jan. 20, 2011, Miglio, et al.
U.S. Appl. No. 13/318,498, filed Nov. 2, 2011, Miglio.
International Search Report issued Aug. 6, 2009 in PCT/EP09/003850 filed May 28, 2009.
U.S. Appl. No. 13/062,585, filed Mar. 7, 2011, Miglio, et al.

* cited by examiner

PROCESS FOR THE TREATMENT OF THE AQUEOUS STREAM COMING FROM THE FISCHER-TROPSCH REACTION BY MEANS OF ION EXCHANGE RESINS

The present invention relates to a process for the treatment of the water co-produced in the Fischer-Tropsch synthesis, by means of ion exchange resins.

More specifically, the invention relates to a process for the treatment of the water co-produced in the Fischer-Tropsch reaction by means of the combination of a distillation/stripping step and an ion exchange step.

The Fischer-Tropsch technology for preparing hydrocarbons from blends of gas based on hydrogen and carbon monoxide, known as synthesis gas, is well known in scientific literature. A summary recapitulating the main works on the Fischer-Tropsch reaction is contained in the Bureau of Mines Bulletin, 544 (1955) with the title of "Bibliography of the Fischer-Tropsch Synthesis and Related Processes" H. C. Anderson, J. L. Wiley and A. Newell.

The production process of liquid hydrocarbons by means of the Fischer-Tropsch reaction generates an amount of water, by weight, greater than that of the hydrocarbons, due to the production of a mole of water for each mole of CO converted into hydrocarbons.

Before purification, the reaction water (co-produced water) is subjected to preliminary separation. It normally passes through a triphase separator, from which an organic condensate is obtained, together with a vapour phase and an aqueous phase, still containing organic compounds, both dissolved and in suspension, and is preferably treated in a coalescence filter.

The water thus separated remains contaminated by hydrocarbon compounds, typically less than 1000 ppm and by oxygenated compounds, soluble in water. The amount of contaminants depends on the catalyst and on the reaction conditions, in particular the temperature and pressure. On the whole, the amount of oxygenated compounds increases with an increase in the reaction temperature, the class of the organic acids in a more significant way. The main oxygenated contaminants are light alcohols such as methanol and ethanol, indicatively present from 0.5% by weight to 5% by weight. Heavier alcohols are also present in lower amounts (for example, propanol, butanol, pentanol, etc.) and other oxygenated compounds, such as aldehydes (acetaldehyde, propionaldehyde, butyraldehyde, etc.), ketones (acetone, methylethylketone, etc.) and acids (for example, formic acid, acetic acid, propionic acid, butyric acid, iso-butyric acid, valeric acid, hexanoic acid, heptanoic acid, octanoic acid, etc.), these latter indicatively present at concentrations lower than 1.5% by weight. The amount of compounds present within each group decreases with an increase in the molecular weight, and compounds with up to 25 carbon atoms can be found. The water can contain small amounts of nitrogenated and sulphurated compounds which derive from the feedstock used, in addition to traces of metals coming from the reactor. The metals can also be present in the form of suspended solids.

The stream as such has no commercial value and cannot be disposed of as such, the oxygenated compounds (acids), moreover, confer corrosive properties, the hydrocarbons give the tendency of forming foams (foaming).

Meteoric water or other forms of service water present in the production site, can be added to the water co-produced.

A water treatment plant is therefore necessary for the re-use of the water within the Fischer-Tropsch process, for example, as cooling water in the synthesis section, or for its outward disposal or for other possible uses, as irrigation water or drinking water.

The treatment or combination of treatments on the waters co-produced is determined by the restrictions imposed by the final destination of the water and by the organic compounds present therein.

The water treatment plant is normally of the biological type, which can be preceded by a treatment, typically stripping/distillation, to remove the most volatile organic compounds. The water coming from the biological treatment is normally subjected to a further finishing treatment to remove the solid products and, if necessary, also the residual salts from the biological treatment. An approach of this type is described, for example, in U.S. Pat. No. 7,166,219, U.S. Pat. No. 7,150,831, U.S. Pat. No. 7,153,392 (SASOL) and WO 2005/113426 (STATOIL—PETROLEUM OIL & GAS CORP. SOUTH AFRICA).

In some phases of the plant management, the presence in the co-produced water of metals and of suspended solids deriving from the catalyst, is also significant and must therefore be specifically controlled in relation to the final use of the water, as described, for example, in WO 2006/108195 (STATOIL).

When the water is treated by means of a biological process, the organic compounds contained therein are degraded to $CO_2$, $H_2O$ or $CO_2$, $CH_4$ and $H_2O$, and the dosage of the "chemicals" required by the biological process, of both the aerobic type and anaerobic type, leads to the production of a sludge, which can indicatively vary from 0.05 kg to 0.5 kg per kg of biodegraded COD.

Biological treatments are, normally, expensive as a result of the chemicals to be used (for example urea, phosphates, etc.), of the large volumes of the treatment tanks/reactors, of the times of the biological reactions which are in the order of hours, and of the air to be insufflated, when aerobic treatment is used. Another jeopardizing effect of biological treatment is that the organic compounds present in the water cannot be upgraded.

Should the organic compounds present in the co-produced water be upgraded, instead of biodegraded, a physico-chemical treatment must be applied. In U.S. Pat. No. 6,462,097 (IFP-ENI), for example, a process is described in which, after the stripping treatment, an adsorption step on activated carbons is envisaged. Subsequently, the stream coming from said adsorbing step on activated carbons, rich in organic compounds, can be fed back to the synthesis reactor. Similar suggestions are also mentioned, for example, in U.S. Pat. No. 6,225,358 (SYNTROLEUM CORP), U.S. Pat. No. 5,053,581, U.S. Pat. No. 5,004,862 (EXXON), in which, potentially, the organic compounds, for example $C_1$ to $C_6$ alcohols present in the co-produced water, are transformed into simple molecules such as $CO_X/H_2$ (syngas) and then upgraded.

Other types of treatment, of a physico-chemical nature, allow one or more aqueous streams enriched in organic compounds to be separated, simultaneously with the production of water purified to the required degree.

A mainly alcoholic stream with an amount of non-acid compounds (NAC) of 55% by weight up to a max of 85% by weight, can be separated by distillation, for example, as described in US 2004/0262199 (SASOL) and in Italian patent application MI07A001209 (ENI). This stream can be used as fuel or, alternatively, it can be further processed to recover valuable products.

The formation, by means of physico-chemical treatments, of one or more streams enriched in different groups of organic products, together with the production of water purified to the required degree, is described, for example, in U.S. Pat. No. 7,153,432 (SASOL) in which a process of at least two steps is proposed, the first, a distillation step, the second, membrane separation and, in addition, other accessory steps, when necessary, to bring the purified water back to the required degree of purity.

It has now been found that, by means of the original combination of two types of physico-chemical treatments, such as distillation and ion exchange, the separation of an aqueous stream enriched in alcohols and an aqueous stream enriched in organic acids, from the water co-produced in the Fischer-Tropsch synthesis can be effected simply and conveniently and, at the same time, purified water at the desired degree can be obtained.

The purified water can be of a quality suitable for its reuse in the same process, or suitable for use in agriculture, or to be disposed off as surface water, according to the legislations in force.

In accordance with this, an object of the present invention relates to a process for the treatment of the aqueous stream coming from the Fischer-Tropsch reaction comprising:

feeding the aqueous stream containing the organic by-products of the reaction to a distillation or stripping column;

separation from the column of an aqueous stream enriched in alcohols having from 1 to 8 carbon atoms and other possible volatile compounds;

feeding the aqueous stream containing the organic acids coming from the bottom of the distillation column to an ion exchange step wherein said aqueous stream is put in contact with an anionic exchange resin bed and the production of two outgoing aqueous streams;

an aqueous stream (i) enriched in organic acids having from 1 to 8 carbon atoms;

a purified aqueous stream (ii) with a low content of organic acids.

The aqueous stream (i) and the aqueous stream (ii) can possibly contain salts of organic acids contained therein. If present, however these salts are in an amount lower than 5% by weight with respect to the total amount of said organic acids.

In practice, the reaction water, together with other possible process water, is subjected to distillation, after possible cooling.

The aqueous stream containing the organic acids leaving the bottom of the distillation column, is put in contact with anionic exchange resins, in order to subtract the anions of the organic acids from this aqueous stream and to release hydroxide ions, which is equivalent to removing the organic acids present.

According to the regeneration method of the anionic exchange resins, the process of the invention can also include an electrodialysis step in order to separate from the aqueous stream (i) enriched in organic acids deriving from the ion exchange step in the form of salts, an aqueous stream (iii) enriched in organic acids and a basic aqueous stream (iv) containing, for example, NaOH which can be re-used in the ion exchange treatment for the regeneration of the resins.

The Fischer-Tropsch reaction can be effected as described in U.S. Pat. No. 6,348,510.

According to the specific purification requirements (final use), additional preliminary, intermediate and final steps can also be included, such as filtration, for example.

The aqueous stream enriched in alcohols has an alcohol concentration preferably ranging from 25% by weight to 75% by weight; the aqueous stream (i) enriched in organic acids has a concentration of organic acids preferably ranging from 3% by weight to 10% by weight; the purified aqueous stream (ii) with a low content of organic acids, has a concentration of organic acids preferably lower than 0.01% by weight.

The aqueous stream coming from the Fischer-Tropsch reaction is preferably first subjected to distillation and the aqueous stream containing the organic acids leaving the bottom of the distillation column is fed to the ion exchange step.

Alternatively, the aqueous stream coming from the Fischer-Tropsch reaction can be first fed to the ion exchange step and the distillation can be subsequently effected on the purified aqueous stream (ii) with a low content of organic acids leaving the ion exchange step.

Should the aqueous stream to be treated contain metallic cations in solution and the regeneration of the resin also be effected by means of an electrodialysis step, it is convenient to treat said aqueous stream on a cationic exchange resin bed or a bed of chelating resin, in acid form, before being put in contact with an anionic exchange resin bed.

Among the anionic exchange resins which can be advantageously used in the process of the present invention, there are strong basic resins having at least one functional group selected from quaternary ammonium groups and the weak basic resins having at least one amine functional group. Weak basic resins are preferred. Among the various commercial resins, resins having a divinyl benzene-styrene matrix or an acrylic divinyl benzene matrix, with at least one amine functional group, are preferred.

The aqueous stream containing organic acids leaving the bottom of the column is put in contact with the resin bed, typically by fluxing on the resin bed.

The resins used are preferably in the form of hydroxyide (OH), so that in the aqueous stream treated no other anions are released during the exchange with the anions of the organic acids (carboxylic). If the resins are available in other forms, they are preferably converted into OH form.

There are no particular restrictions on the concentrations of the aqueous solutions to be used for converting the resins into a suitable form. Normally the aqueous solutions have a concentration of 1% by weight to 10% by weight, preferably of from 3% by weight to 7% by weight, for example an aqueous solution of NaOH with a concentration of from 4% by weight to 6% by weight, can be used.

According to the present invention, it is preferable to operate with a configuration which includes two or more anionic exchange resin beds, situated in series and/or in parallel with respect to the flow of the agueous stream to be treated, in order to always have at least one bed operating in the removal step of the organic acids, preferably two in series, and at least one bed in regeneration or washing phase. When two beds in series are present in the removal phase, the first bed is inserted as second in the subsequent cycle. In this way, each resin bed is cyclically subjected to a removal phase of the organic acids (A) and to a regeneration phase (B), the two mentioned phases can be alternated with washing phases with deionized water.

The removal phase of organic acids (A) can be effected in a specific fixed bed reactor, the space velocity BV/h (wherein BV/h=liquid stream volume/resin volume/h) at which the aqueous stream is put in contact with the resin bed preferably ranges from 1 BV/h to 10 BV/h, more preferably from 1 BV/h to 5 BV/h, whereas there is no limitation with respect to the pressure which must only be sufficient for compensating the load drops of the resin bed. Suitable temperatures are preferably lower than 60° C., more preferably lower than 50° C.

There are no restrictions with respect to the concentrations of the acid aqueous streams which can be treated, even if, within the scope of the present invention, acid aqueous streams having a content of organic acids lower than 1.5% by weight are preferred, even more preferably of from 0.05% by weight to 0.30% by weight. The presence of alcohols or hydrocarbons at an overall level lower than 5% by weight does not significantly interfere with the removals.

The amount of acid aqueous stream which can be purified depends on the exchange capacity of the resin used and on the concentration of anions present in the acid aqueous stream. When the removal of the organic acids from the aqueous stream which has been put in contact with the resin is no longer sufficiently effective, the resin must be regenerated.

On the basis of the operative capacity of the resin used, of the BV volume of the aqueous stream treated (where BV=liquid stream volume/resin volume), of the breakthrough curve, as known to experts in the field, purified water can be obtained having a low content of residual organic acids, for example, a content of organic acids lower than 0.012% by weight, suitable for irrigation or industrial use, or lower than 0.001% by weight, with a conductivity lower than 5 microS/cm, essentially free of salts. The residual traces of alcohols, for example, methanol, and hydrocarbons present in the aqueous stream leaving the bottom of the distillation column either remain unaltered or are further reduced after the contact with the resin bed.

The process by which the regeneration phase of the resin (B) is carried out, is essential for producing a stream enriched in organic acids simultaneously with a stream purified to the required degree. The regeneration phase of the anionic exchange resin situated in a fixed bed is generally carried out at a space velocity of the regenerating aqueous solution of 0.5 BV/h to 20 BV/h, preferably from 1 BV/h to 5 BV/h.

The resin bed can be regenerated (phase B) by fluxing with an aqueous solution of a strong acid, for example an aqueous solution of HCl at a concentration ranging from 1% by weight to 10% by weight, preferably from 3% by weight to 7% by weight, in an at least stoichiometric amount with respect to the anions of the organic acids charged on the resins during the removal phase of the organic acids (A), producing a stream concentrated in organic acids and a resin bed in the form of chloride. The resin bed is fluxed with deionized water to remove the wetting liquid of the resin and then fluxed with a basic aqueous solution, for example, an aqueous solution of NaOH at a concentration of from 1% by weight to 10% by weight, preferably of from 3% by weight to 7% by weight, in an amount equal to the capacity of the resin saturated with acid, producing a basic aqueous solution of NaCl essentially free of organic acids having, for example, a COD lower than 160 ppm. If necessary, the resin bed is fluxed again with deionized water, so that it is suitable for the subsequent removal phase of the organic acids (A).

Alternatively, the resin bed can be regenerated (phase B) by fluxing with a basic aqueous solution, for example, an aqueous solution of NaOH, having a concentration of from 1% by weight to 10% by weight, preferably of from 3% by weight and 7% by weight, producing a stream of salified organic acids.

The above-mentioned stream of salified organic acids has, at the outlet, a weight concentration typically higher than the regenerated aqueous solution, which increases according to the ratio between the molecular weight of the base and the average molecular weight of the organic acids present in the stream and which are salified.

The regenerating aqueous solution is used in such an amount so as to be normally equal to or to exceed the stoichiometric amount necessary for regenerating the resin. The reagents for the regeneration are preferably selected from sodium hydroxide and potassium hydroxide.

The fluxing with the basic aqueous solution can be separated from the removal phase of the organic acids (A) by a washing phase, for example with deionized water, in order to avoid the contact between the acid water and the basic aqueous solution. When the washing phase is not interposed between the removal phase of the organic acids and the resin regeneration, various recyclings must be included, for example, to ensure that the aqueous stream is purified to the required degree and at the same time, the base used is completely converted to salt. After the regeneration, for example, the first volume (1 BV) or fraction of volume, of the aqueous stream is fed to a resin bed containing, as wetting liquid, an aqueous solution containing the salified organic acids and the possible excess of base; the corresponding volume of stream leaving the resin bed will not be purified to the required degree, but resort can be made to a reuse/recycling of said volume in the regeneration phase, after the addition of the base in the amount required by the stoichiometry.

The aqueous solution of salified organic acids is subjected to an electrodialysis treatment in a bipolar configuration, to obtain an aqueous stream containing organic acids at a concentration preferably ranging from 5% by weight to 9% by weight and a basic aqueous solution, for example an aqueous solution of NaOH at a concentration preferably ranging from 3% by weight to 7% by weight to be recirculated as basic aqueous solution for the regeneration of the resin, except for a possible addition of a base. The above-mentioned aqueous stream containing organic acids can still contain residues of said salified organic acids.

Said salified organic acids, however, if present, are in an amount lower than 5% by weight with respect to the total amount of said organic acids.

The dimensioning of the beds and the number of lines, in series and/or in parallel, and the possibility of recycling of inner aqueous streams for the preparation of the regenerating aqueous streams, is mainly effected, as is known in the field, on the basis of the concentration of organic acids in the aqueous stream leaving the bottom of the distillation column, and of the residual amount of organic acids to be obtained in the purified aqueous stream.

The passage on the resins can also precede the distillation.

A further purification step on a cationic resin bed or with chelating agents can be added to the purification process with anionic exchange resins, according to the necessity for operations which must be effected down-stream on the purified aqueous stream.

Some illustrative and non-limiting examples are provided hereunder for a better understanding of the present invention and for its embodiment.

EXAMPLE 1

Figure 1:
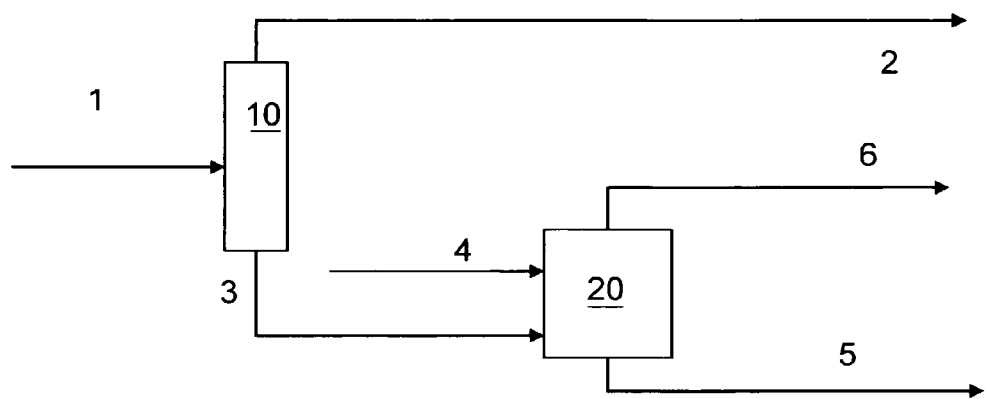
FIG. 1 shows a flow diagram depicting the process of Example 1 for the treatment of the aqueous stream coming from the Fischer-Tropsch reaction by ion exchange resins.

After effecting the Fischer-Tropsch reaction as disclosed by U.S. Pat. No. 6,348,510 (IFP-ENI) and with reference to FIG. 1, the water which is separated by decanting from the reaction effluent (stream 1) is fed to a distillation column (10).

An aqueous stream rich in alcohols (stream 2) is separated from the head of the column, whose composition, obtained by gas-chromatography, is reported in Table 1.

The composition of the water which is separated by decanting from the reaction effluent, obtained by means of gas-chromatography, is reported in Table 1 (stream 1).

Figure 2:
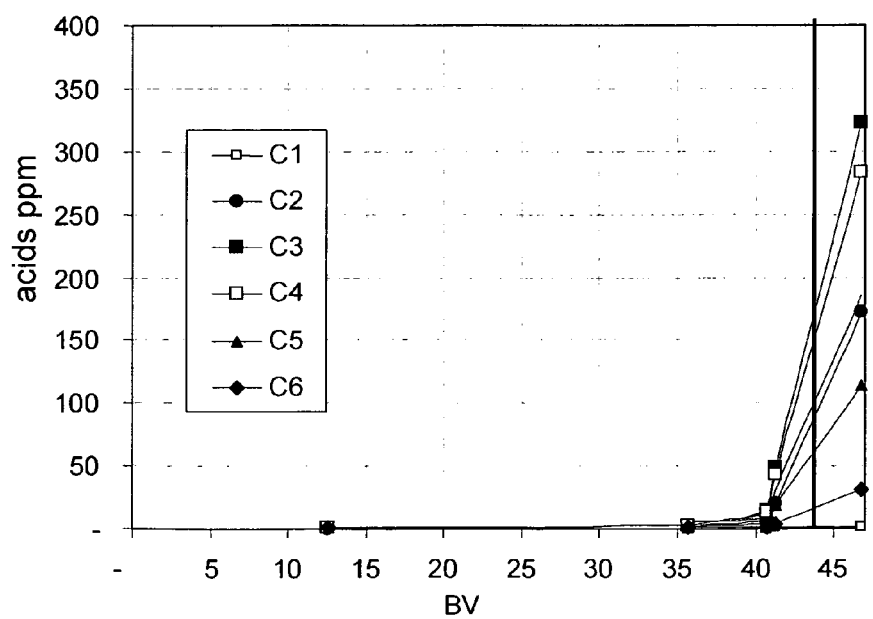
FIG. 2 shows the results of an ionic chromatography analysis of the organic acids contained in the aqueous stream leaving the ion exchange resin bed of the process of Example 1.

The aqueous stream leaving the bottom of the distillation column (stream 3), whose composition, obtained by gas-chromatography (to determine the amount of alcohols) and by means of ionic chromatography (to determine the amount of organic acids) is reported in Table 1, is subsequently fed to an anionic exchange resin bed (20) of the type AMBERLYST A24 of Rohm&Haas. After fluxing 12 BV of aqueous stream leaving the bottom of the distillation column, at 25° C. and a flow equal to 10 BV/h, the COD of the aqueous stream leaving the resin bed is proved to be lower than 5 mg $O_2$/l, with a conductivity lower than 4 microS/cm. The resin was fluxed with a total of 50 BV of the aqueous stream leaving the bottom of the distillation column. During the fluxing, samples of a stream leaving the resin bed were collected, and an analysis of the organic acids contained therein was effected by means of ionic chromatography. The results are shown in FIG. 2.

The resin was then fluxed with 4 BV of deionized water, with 2 BV of an aqueous solution of NaOH at 5.2% by weight, with 10 BV of deionized water (stream 4) and finally fluxed again with the aqueous stream leaving the bottom of the column (stream 3). The resin was fluxed with a total of 43 BV of the aqueous stream leaving the bottom of the distillation column, the aqueous stream was entirely collected and an analysis of the organic acids present was effected by means of ionic chromatography (stream 5): the results obtained are reported in Table 1.

The regeneration was also repeated by entirely collenting the stream (stream 6) leaving the resin after further fluxing of 2 BV of an aqueous solution of NaOH at 5.2% by weight and 1 BV of washing water. Therefore, an analysis of the salified organic acids was effected by means of ionic chromatography and the results obtained are reported in Table 1.

EXAMPLE 2

Figure 3:
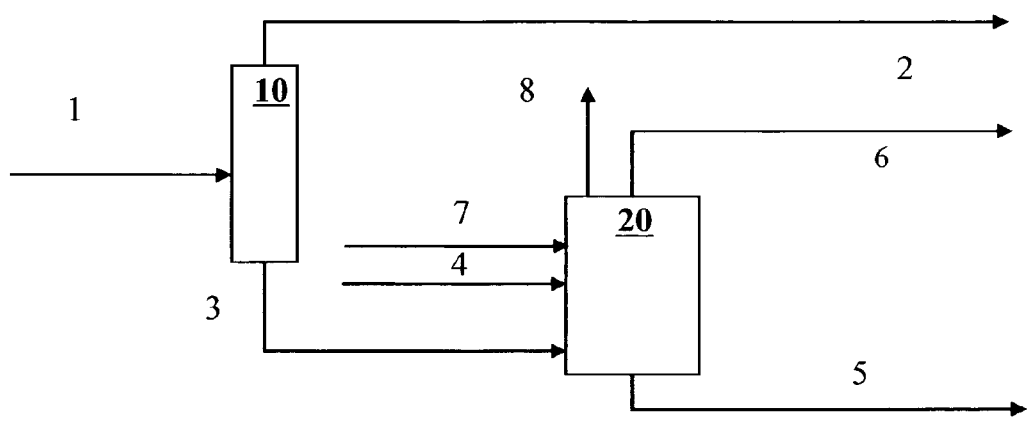
FIG. 3 shows a flow diagram depicting the process of Example 2 for the treatment of the aqueous stream coming from the Fischer-Tropsch reaction by ion exchange resins.

After effecting the Fischer-Tropsch reaction as disclosed by U.S. Pat. No. 6,348,510 (IFP-ENI) and with reference to FIG. 3, the water which is separated by decanting from the reaction effluent (stream 1) is fed to a distillation column (10).

The composition of the water separated by decanting from the reaction effluent, obtained by gas-chromatography, is reported in Table 2.

A stream enriched in alcohol (stream 2), whose composition, obtained by means of gas-chromatography, is reported in Table 2, is separated from the head of the column. 85 BV of the aqueous stream leaving the bottom of the column (stream 3) whose composition, obtained by gas-chromatography (to determine the amount of alcohols) and by means of ionic chromatography (to determine the amount of organic acids), is reported in Table 2, are fed to the resin bed as described in example 1. The stream leaving the resin bed (stream 5) was entirely collected and an analysis of the organic acids present was effected by means of ionic chromatography. The results obtained are reported in Table 2.

1.3 BV of an aqueous solution of HCl at 4.8% by weight and 2 BV of deionized water (stream 4) were then fed. A sample was collected of the corresponding outgoing stream (stream 6) equal to 0.5 BV, in correspondence with the lower pH value (pH=0.4) and an analysis of the organic acids present was effected by means of ionic chromatography: the results obtained are reported in Table 2.

1.9 BV of an aqueous solution of NaOH at 5.2% (stream 7) were subsequently fed (excess of 50% with respect to the exchange capacity of the resin). The corresponding aqueous stream at the outlet has a pH>7 (stream 8).

TABLE 1

|  | Stream 1 Column inlet | Stream 3 Column bottom stream | Stream 5 Purified stream | Stream 6 Stream enriched in salified acids | Stream 2 Stream enriched in alcohols |
|---|---|---|---|---|---|
| Conductivity (micros/cm) | n.d. | 305 | n.d. | n.d. | n.d. |
| pH | n.d. | 3.0 | n.d. | n.d. | n.d. |
| Alcohols (% by weight) | | | | | |
| $C_1H_4O_1$ | 2.3 | 0.004 | 0.001 | n.d. | 41.19 |
| $C_2H_6O_1$ | 0.77 | 0.001 | n.d. | n.d. | 13.56 |
| $C_3H_8O_1$ | 0.32 | 0.0008 | n.d. | n.d. | 5.73 |
| $C_4H_{10}O_1$ | 0.18 | <0.0005 | n.d. | n.d. | 3.20 |
| $C_5H_{12}O_1$ | 0.07 | n.d. | n.d. | n.d. | 1.29 |
| $C_6H_{14}O_1$ | 0.02 | n.d. | n.d. | n.d. | 0.35 |
| Total | 3.66 | <0.006 | 0.001. | — | 65.32 |
| Acids (% by weight) | | | | | |
| $C_1H_2O_2$ | n.d. | 0.023 | 0.0002 | 0.266 | n.d. |
| $C_2H_4O_2$ | n.d. | 0.133 | 0.0012 | 2.04 | n.d. |
| $C_3H_6O_2$ | n.d. | 0.059 | 0.0022 | 0.759 | 0.0084 |
| $C_4H_8O_2$iso | n.d. | 0.006 | 0.0003 | 0.101 | n.d. |
| $C_4H_8O_2$ | n.d. | 0.028 | 0.0013 | 0.541 | 0.006 |
| $C_5H_{10}O_2$ | n.d. | 0.021 | 0.0006 | 0.236 | 0.002 |
| $C_6H_{12}O_2$ | n.d. | 0.004 | <0.0002 | 0.060 | 0.001 |
| Total | n.d. | 0.274 | <0.006 | 4.0 | 0.017 | n.d.: not determined

TABLE 2

|  | Stream 1 Column inlet | Stream 3 Column bottom stream | Stream 5 Purified stream | Stream 6 Stream enriched in salified acids | Stream 2 Stream enriched in alcohols |
|---|---|---|---|---|---|
| Conductivity (micros/cm) | n.d. | 355 | n.d. | n.d. | n.d. |
| pH | n.d. | 3.4 | 7 | 0.4 | n.d. |
| Alcohols (% by weight) | | | | | |
| $C_1H_4O_1$ | 2.46 | 0.002 | 0.002 | n.d. | 41.19 |
| $C_2H_6O_1$ | 0.8 | n.d. | n.d. | n.d. | 13.56 |
| $C_3H_8O_1$ | 0.34 | n.d. | n.d. | n.d. | 5.73 |
| $C_4H_{10}O_1$ | 0.19 | n.d. | n.d. | n.d. | 3.20 |
| $C_5H_{12}O_1$ | 0.08 | n.d. | n.d. | n.d. | 1.29 |
| $C_6H_{14}O_1$ | 0.02 | n.d. | n.d. | n.d. | 0.35 |
| Total | 3.89 | 0.002 | 0.002 | — | 65.32 |
| Acids (% by weight) | | | | | |
| $C_1H_2O_2$ | n.d. | 0.018 | 0.0018 | 1.73 | n.d. |
| $C_2H_4O_2$ | n.d. | 0.070 | 0.0040 | 3.53 | n.d. |
| $C_3H_6O_2$ | n.d. | 0.013 | 0.0018 | 0.463 | 0.008 |
| $C_4H_8O_2$iso | n.d. | 0.009 | n.d. | 0.06 | n.d. |
| $C_4H_8O_2$ | n.d. | 0.003 | n.d. | 0.260 | 0.006 |
| $C_5H_{10}O_2$ | n.d. | 0.0005 | n.d. | 0.103 | 0.002 |
| $C_6H_{12}O_2$ | n.d. | 0.0001 | n.d. | 0.108 | 0.001 |
| Total | n.d. | 0.110 | 0.0076 | 6.157 | 0.017 | n.d.: not determined

The invention claimed is:

1. A process for the treatment of the aqueous stream coming from the Fischer-Tropsch reaction comprising:
feeding the aqueous stream containing the organic by-products of the reaction to a distillation or stripping column;
separating an aqueous stream enriched in alcohols having from 1 to 8 carbon atoms and other possible volatile compounds from the column;
subjecting the aqueous stream containing the organic acids leaving the bottom of the distillation column to ion exchange whereby said aqueous stream is put in contact with an anionic exchange resin bed and the following two outgoing aqueous streams are produced:
an aqueous stream (i) enriched in organic acids having from 1 to 8 carbon atoms;
a purified aqueous stream (ii) with a low content of organic acids;
wherein the aqueous stream is treated on a cationic exchange resin bed or a bed of chelating resin, in acid form, before contact with the anionic exchange resin.

2. The process according to claim 1, wherein the ionic exchange comprises two or more anionic exchange resin beds situated in series and/or in parallel, with respect to the flow of the aqueous stream to be treated.

3. The process according to claim 1, wherein the aqueous stream enriched in alcohols has an alcohol concentration ranging from 25% by weight to 75% by weight; the aqueous stream (i) enriched in organic acids, has a concentration of organic acids ranging from 3% by weight to 10% by weight and the purified aqueous stream (ii) with a low content of organic acids, has a concentration of organic acids lower than 0.01% by weight.

4. The process according to claim 1, wherein the anionic exchange resin is a weak basic resin having at least one functional amine group.

5. The process according to claim 1, wherein the anionic exchange resin is a in the form of a hydroxide (OH).

6. The process according to claim 1, wherein the anionic exchange resin is selected from resins with a styrene-divinyl benzene matrix or an acrylic-divinyl benzene matrix, having at least one functional amine group.

7. The process according to claim 1, wherein the ion exchange is carried out in a fixed bed reactor, wherein the aqueous stream is put in contact with the resin bed, at a space velocity of 1 BV/h to 10 BV/h and at a pressure sufficient for compensating the load drops of the resin bed and at temperatures lower than 60° C.

8. The process according to claim 1, wherein the anionic exchange resin is regenerated by fluxing with an aqueous solution of a strong acid in an at least stoichiometric amount with respect to the anions of the organic acids charged on the resin during the removal phase of the organic acids, with a space velocity of the regenerated aqueous solution of 0.5 BV/h to 20 BV/h, producing a stream enriched in organic acids and a resin bed in the form of a chloride; the resin is subsequently fluxed with deionized water, then with a basic aqueous solution and again with deionized water, if necessary.

9. The process according to claim 8, wherein the strong acid is hydrochloric acid, the space velocity of the regenerating aqueous solution ranges from 1 BV/h to 5 BV/h and the basic aqueous solution is an aqueous solution of NaOH.

10. The process according to claim 1, wherein the cationic exchange resin is regenerated by fluxing with a basic aqueous solution, in such an amount that it is equal to or exceeds the stoichiometric amount necessary for regenerating the resin, interposing a washing phase between the removal phase of the organic acids and the regeneration of the resin, producing a stream of salified organic acids which is subjected to an electrodialysis treatment in a bipolar configuration, to obtain an aqueous stream of organic acids and a basic aqueous stream to be recirculated as basic aqueous solution for the regeneration of the resin.

11. The process according to claim 1, wherein the aqueous stream containing the organic acids subjected to ion exchange has a pH no less acid than 3.4.

12. The process according to claim 11, wherein the aqueous stream containing the organic acids subjected to ion exchange has a pH of $0.4<pH\leq3.4$.

13. The process according to claim 1, wherein the aqueous stream containing the organic acids subjected to ion exchange is directly fed from the bottom of the distillation column to an ion exchanger.

14. The process according to claim 11, wherein the aqueous stream containing the organic acids subjected to ion exchange is directly fed from the bottom of the distillation column to an ion exchanger.

15. A process for the treatment of the aqueous stream coming from the Fischer-Tropsch reaction consisting essentially of:
- feeding the aqueous stream containing the organic by-products of the reaction to a distillation or stripping column;
- separating an aqueous stream enriched in alcohols having from 1 to 8 carbon atoms and other possible volatile compounds from the column;
- directly feeding the aqueous stream containing the organic acids leaving the bottom of the distillation column to an ion exchanger wherein said aqueous stream is put in contact with an anionic exchange resin bed and the following two outgoing aqueous streams are produced:
  - an aqueous stream (i) enriched in organic acids having from 1 to 8 carbon atoms;
  - a purified aqueous stream (ii) with a low content of organic acids.

16. The process according to claim 14, wherein the aqueous stream containing the organic acids directly fed to the ion exchanger has a pH no less acid than 3.4.

17. The process according to claim 16, wherein the aqueous stream containing the organic acids directly fed to the ion exchanger has a pH of $0.4<pH\leq3.4$.

18. The process according to claim 1, wherein the aqueous stream containing the organic acids leaving the bottom of the distillation column which is subjected to ion exchange contains metal or suspended solids derived from a catalyst employed in the Fischer-Tropsch reaction.

19. The process according to claim 15, wherein the aqueous stream containing the organic acids leaving the bottom of the distillation column is subjected to ion exchange contains metal or suspended solids derived from a catalyst employed in the Fischer-Tropsch reaction.

* * * * *